United States Patent
Kuroda et al.

(10) Patent No.: US 11,254,241 B2
(45) Date of Patent: Feb. 22, 2022

(54) SEAT SLIDING DEVICE FOR VEHICLES

(71) Applicants: TF-METAL Co., Ltd., Kosai (JP); TOYOTA BOSHOKU KABUSHIKI KAISHA, Kariya (JP); TACHI-S CO., LTD., Tokyo (JP)

(72) Inventors: Shunsuke Kuroda, Kosai (JP); Kazuki Tamaki, Kosai (JP)

(73) Assignees: TF-METAL CO., LTD., Kosai (JP); TOYOTA BOSHOKU KABUSHIKI KAISHA, Kariya (JP); TACHI-S CO., LTD., Tokyo (JP)

( * ) Notice: Subject to any disclaimer, the term of this patent is extended or adjusted under 35 U.S.C. 154(b) by 128 days.

(21) Appl. No.: 16/711,565

(22) Filed: Dec. 12, 2019

(65) Prior Publication Data

US 2020/0189424 A1    Jun. 18, 2020

(30) Foreign Application Priority Data

Dec. 18, 2018  (JP) .............................. JP2018-235959
Dec. 18, 2018  (JP) .............................. JP2018-235960

(51) Int. Cl.
*B60N 2/07*    (2006.01)
*B60N 2/08*    (2006.01)

(52) U.S. Cl.
CPC ......... *B60N 2/0715* (2013.01); *B60N 2/0705* (2013.01); *B60N 2/0727* (2013.01); *B60N 2/0818* (2013.01); *B60N 2/0875* (2013.01)

(58) Field of Classification Search
USPC ........................ 248/424, 429, 430; 296/65.13
See application file for complete search history.

(56) References Cited

U.S. PATENT DOCUMENTS

| 6,688,574 | B2 | 2/2004 | Okazaki et al. | |
| 7,637,469 | B2* | 12/2009 | Yamada | B60N 2/0705 |
| | | | | 248/430 |
| 7,758,008 | B2* | 7/2010 | Kojima | B60N 2/0825 |
| | | | | 248/430 |

(Continued)

FOREIGN PATENT DOCUMENTS

| DE | 10 2014 214 184 A1 | 11/2015 |
| DE | 10 2005 003 032 B4 | 6/2017 |
| JP | 2002-154356 A | 5/2002 |

(Continued)

OTHER PUBLICATIONS

Chinese Office Action, Application No. 201911297371.X, dated Dec. 2, 2021, 8 pages.

*Primary Examiner* — Nkeisha Smith
(74) *Attorney, Agent, or Firm* — Foley & Lardner LLP

(57) ABSTRACT

A seat sliding device for vehicles includes lower and upper rails and a locking member for locking or unlocking the upper rail relative to the lower rail. The upper rail is equipped at a lower end of its downward side wall portion with a lower inward corner portion formed of a raised wall portion and a bottom wall portion. The locking member has an axial portion that is placed on and biased against the lower inward corner portion of the upper rail such that the locking member is swingable about an axis of the axial portion to lock or unlock the upper rail relative to the lower rail. This seat sliding device makes it possible to reduce the number of parts and improve operation stability of the locking member.

18 Claims, 8 Drawing Sheets

(56) References Cited

U.S. PATENT DOCUMENTS 9,758,062 B2 * 9/2017 Couasnon ............ B60N 2/0843
2015/0314707 A1 * 11/2015 Couasnon ............ B60N 2/0818
297/344.1

FOREIGN PATENT DOCUMENTS

JP        2006-335104 A    12/2006
JP        2016-165951 A     9/2016

* cited by examiner

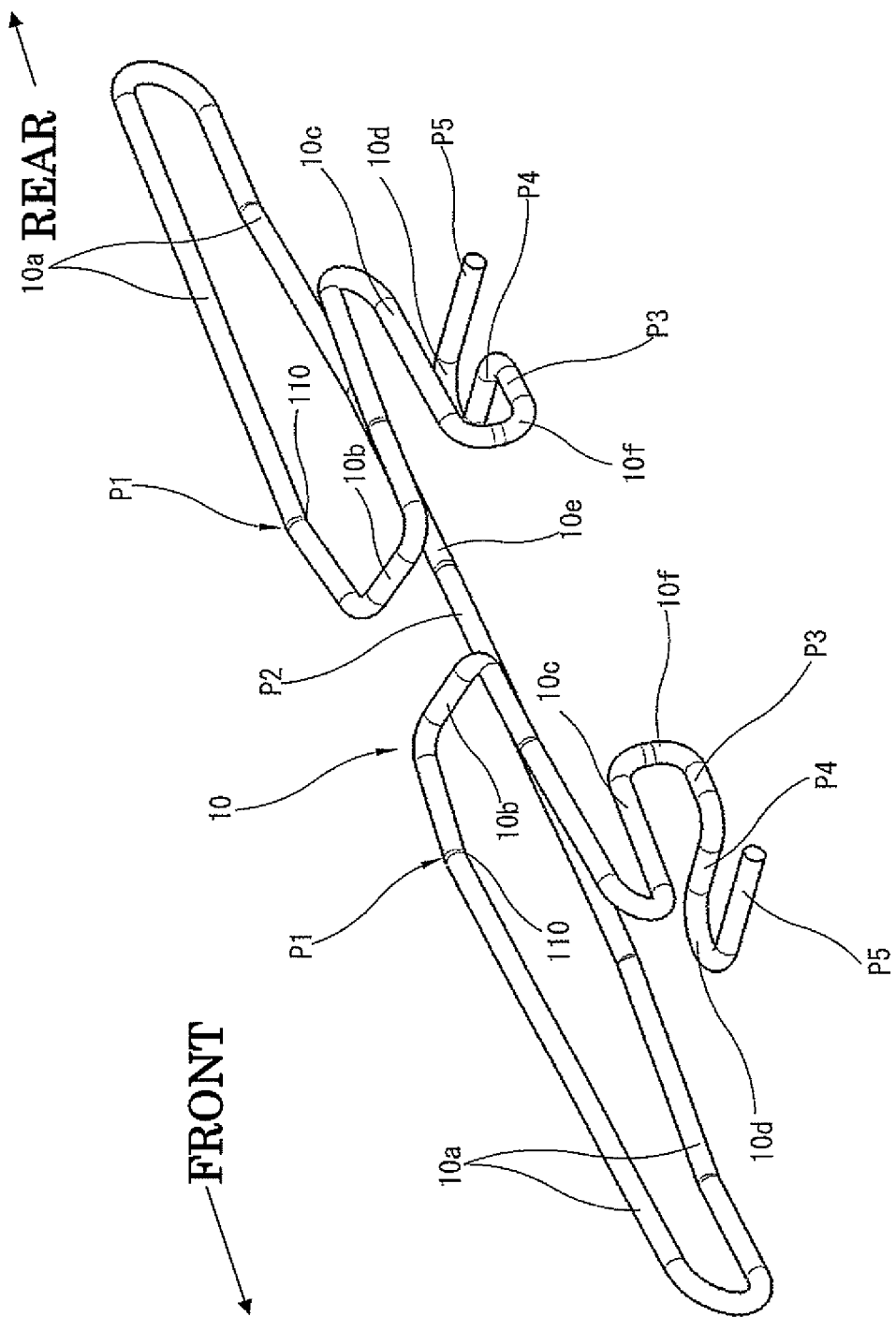

SEAT SLIDING DEVICE FOR VEHICLES

BACKGROUND OF THE INVENTION

The present invention relates to a vehicle seat sliding device that slidably supports a seat mounted on a vehicle, for the purpose of the positional adjustment of the seat and particularly to an improvement of its locking mechanism.

As is widely known, a vehicle seat sliding device of this type is constituted of main components that are a lower rail to be fixed to the vehicle floor surface, an upper rail which is fitted to this lower rail to be slidable in the longitudinal direction and on which a seat is mounted, and a locking mechanism for locking and unlocking the upper rail when conducting the positional adjustment of the upper rail relative to the lower rail.

JP Patent Application Publication 2002-154356, which corresponds to U.S. Pat. No. 6,688,574, discloses a seat sliding device in which a locking member (locking lever) is disposed in an upper rail and is supported to be rotatable or swingable about an axis along the rail longitudinal direction by using a pair of front and rear balls that is supported on a pair of front and rear curled portions at a lower part of a side wall of the upper rail, and in which the lock lever is biased against the locking direction by a plate shaped elastic member.

DE Patent Application Publication 10 2014 214 184 discloses another seat sliding device in which a locking member is disposed in an upper rail and is supported to be swingable about an axis along the rail longitudinal direction by providing an arm portion prepared by inwardly projecting a part of a side wall of the upper rail and then inserting a lower end of the locking member into an opening of the arm portion.

DE Patent 10 2005 003 032 discloses a seat sliding device in which the upper rail is formed at its side wall portion with an opening, a locking member is disposed to extend between the outside and the inside of the upper rail through the opening and is swingably supported on a peripheral portion of the opening, and a single spring member is configured to provide a force to support and press the locking member against the peripheral portion of the opening and a force to bias the locking member against the locking direction.

JP Patent Application Publication 2006-335104 discloses a seat sliding device in which a so-called wire-form-type locking spring prepared by bending a single wire into a predetermined three dimensional shape is adopted as a means for biasing a locking member (latch lever) that is swingably supported on bearings in the upper rail against the locking direction, in order to lessen the difference between the biasing force under the locked condition and that under the unlocked condition of the locking spring.

SUMMARY OF THE INVENTION

The structure disclosed in JP Patent Application Publication 2002-154356 is compact as a whole, but it is cumbersome to handle the balls which are small and roll around easily. Furthermore, the number of parts including the elastic member becomes large, and it takes time to assemble the locking member.

The structures disclosed in DE Patent Application Publication 10 2014 214 184 and DE Patent 10 2005 003 032 do not require a separate member for supporting the locking member on bearings as that in JP Patent Application Publication 2002-154356, but it is not possible to have a large swing angle (rotation angle) of the locking member. Furthermore, it becomes inferior in operation stability by enlarging the swing angle.

Furthermore, the structure disclosed in DE Patent Application Publication 10 2014 214 184 has a defect in which it is not possible in the upper rail to directly unlock the locking member by an operating lever that is inserted into the upper rail, due to the limited inner space of the upper rail. Therefore, it has room for improvement in terms of making the seat rail compact and light in weight.

The structure disclosed in JP Patent Application Publication 2006-335104 makes it possible to achieve a smaller space occupied by the locking spring, but it still has room for improvement in terms of reducing the number of parts of the locking mechanism.

It is therefore an object of the present invention to provide a vehicle seat sliding device that is designed to simplify a locking member's support structure to contribute to making the seat rail more compact and lighter in weight and that is particularly designed to reduce the number of parts and improve operation stability of the locking member.

According to the present invention, there is provided a seat sliding device for vehicles, comprising:

a lower rail having a bottom wall portion, first and second upward side wall portions extending upward from both sides in a width direction of the bottom wall portion, first and second inward top wall portions respectively extending inward from upper ends of the first and second upward side wall portions, first and second downward flange portions respectively extending downward from inner ends of the first and second inward top wall portions;

an upper rail that is fitted to the lower rail such that the upper rail is slidable in a longitudinal direction relative to the lower rail, the upper rail having a top wall portion, first and second downward side wall portions extending downward from both sides in a width direction of the top wall portion, a first upward flange portion extending outward and upward from a lower end of the first downward side wall portion and fitted between the first upward side wall portion of the lower rail and the first downward flange portion of the lower rail, and a second upward flange portion extending outward and upward from a lower end of the second downward side wall portion and fitted between the second upward side wall portion of the lower rail and the second downward flange portion of the lower rail; and a locking mechanism for locking or unlocking the upper rail relative to the lower rail, the locking mechanism having a locking member that is biased in a locking direction to lock the upper rail relative to the lower rail by an engagement of the locking member with the upper and lower rails at a part of the seat sliding device where at least one of the first and second upward side wall portions of the lower rail overlaps with at least one of the first and second downward side wall portions of the upper rail, wherein the upper rail is equipped at a lower end of the first downward side wall portion of the upper rail with a lower inward corner portion that is formed of a raised wall portion and a bottom wall portion, wherein the locking member includes an axial portion having an axis along the longitudinal direction, the axial portion being placed on and biased against the lower inward corner portion of the upper rail such that the locking member is swingable about the axis of the axial portion between a first position where the upper rail is locked relative to the lower rail and a second position where the upper rail is unlocked relative to the lower rail.

In the seat sliding device, the axial portion of the locking member is placed on and biased against the upper rail's lower inward corner portion serving as a bearing. Therefore, the locking member is swingable about the axis of the axial portion of the locking member while the lower inward corner portion serves as a swing fulcrum. This makes it possible to lock and unlock the upper rail relative to the lower rail. It is possible by the seat sliding device to simplify the bearing structure of the locking member and reduce the number of parts. Furthermore, it is possible to stabilize the swing operation of the locking member and increase the swing angle of the locking member. Thus, the seat sliding device is improved in reliability.

BRIEF DESCRIPTION OF THE DRAWINGS

FIG. 8 is an enlarged view showing a locking spring (biasing means) of FIG. 1.

DETAILED DESCRIPTION

Figure 1:
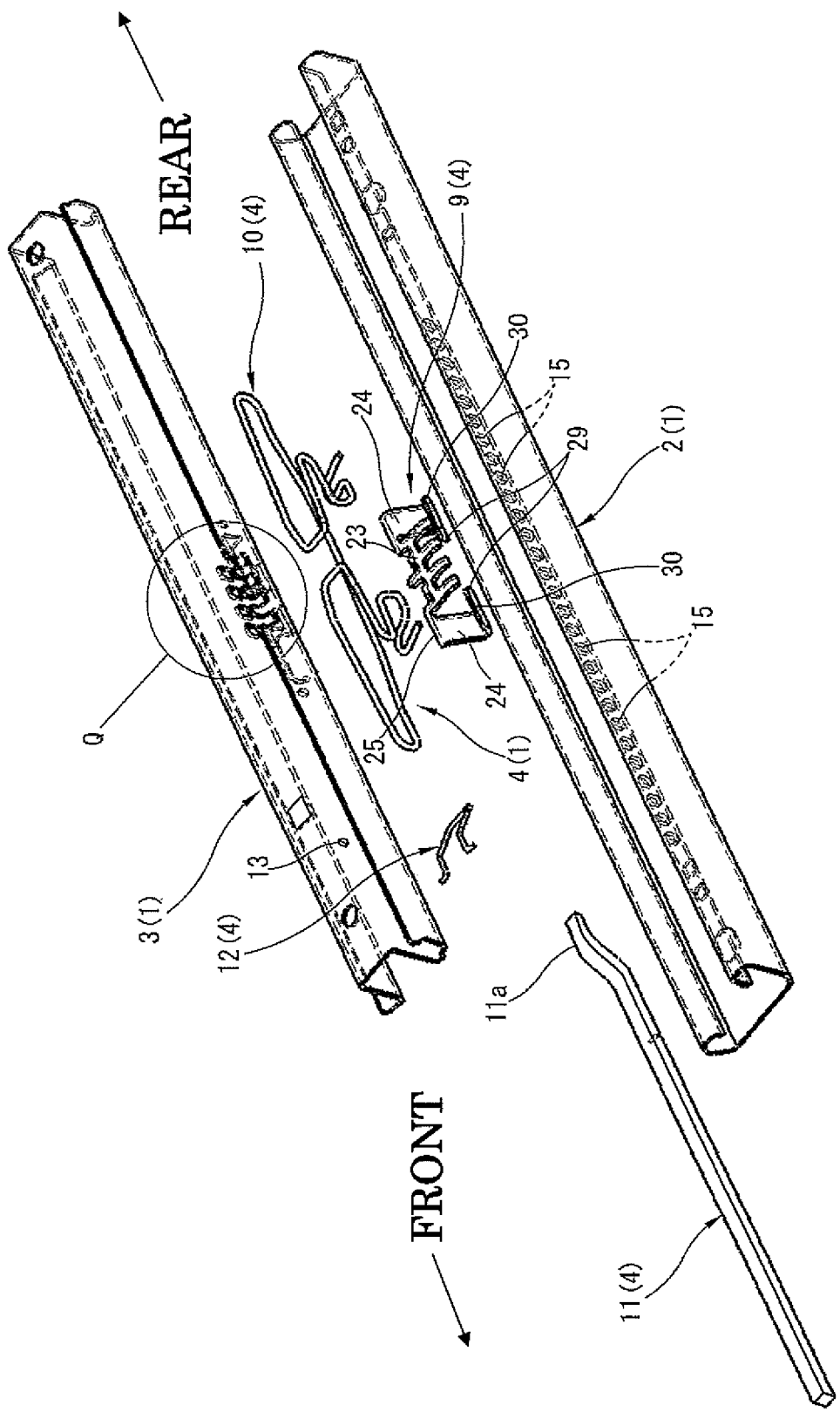
FIG. 1 is an exploded perspective view showing one of two seat rails used as a pair according to an embodiment of a seat sliding device of the present invention.

FIGS. 1-8 show a concrete embodiment of a seat sliding device according to the present invention. In particular, FIG. 1 is an exploded view showing one (the right side) of two seat rails used as a pair extending in the vehicle longitudinal direction as a major component of the seat sliding device. The two seat rails as a pair on the right and left sides have the same structure under a mirror image and are aligned in the vehicle width direction to be parallel with each other.

Figure 2:
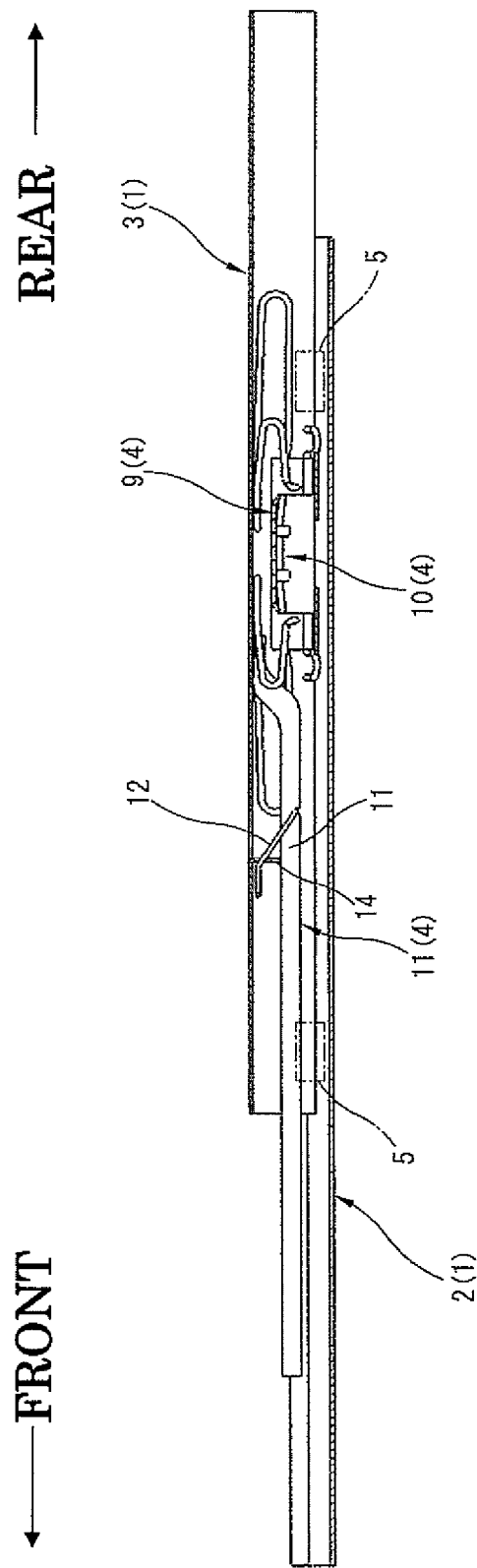
FIG. 2 is a sectional view along the longitudinal direction of the seat rail shown in FIG. 1.
Figure 3:
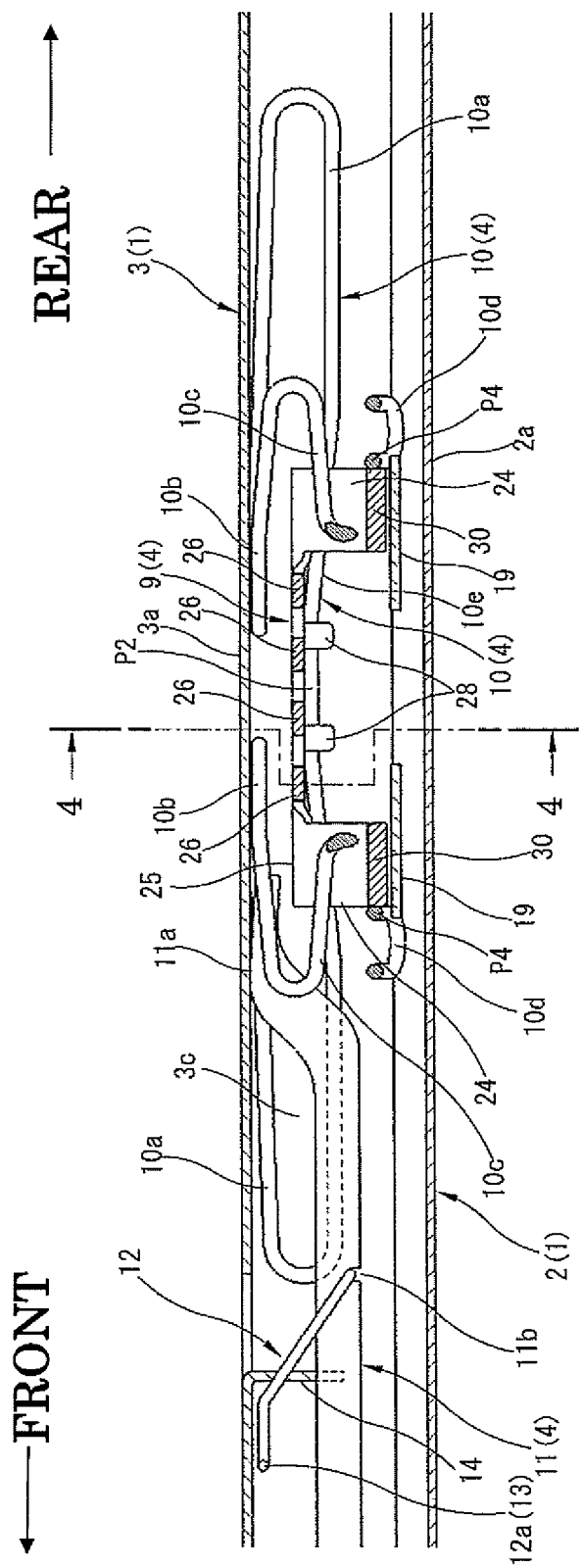
FIG. 3 is an enlarged view showing a main part of FIG. 2.
Figure 4:
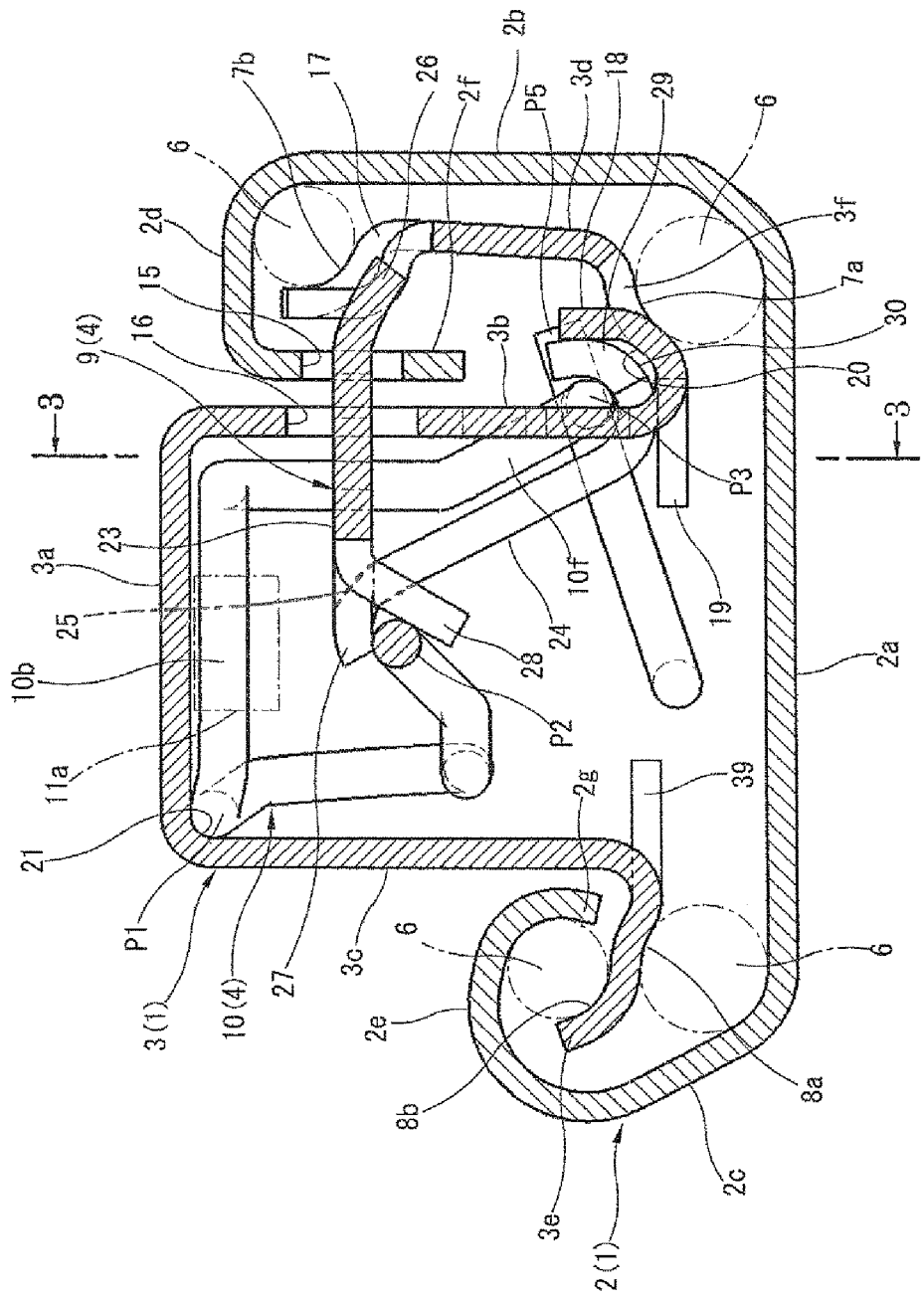
FIG. 4 is an enlarged sectional view taken along the line 4-4 of FIG. 3.

FIG. 2 is a sectional view along the rail longitudinal direction of the seat rail 1 shown in FIG. 1. FIG. 3 is an enlarged view showing a major part of FIG. 2. FIG. 4 is an enlarged sectional view taken along a section perpendicular to the rail longitudinal direction of the seat rail 1 shown in FIGS. 2 and 3. Each of FIGS. 2 and 3 shows a section taken along the line 3-3 of FIG. 4. FIG. 4 shows a section taken along the line 4-4 of FIG. 3.

As shown in FIGS. 1 and 2, the seat rail 1 is mainly constituted of a lower rail 2, an upper rail 3 that is fitted to the lower rail 2 to be slidable in the longitudinal direction, and a locking mechanism 4 for locking and unlocking the upper rail 3 relative to the lower rail 2. Onto the upper rail 3, a seat not shown in the drawings is fixed by bolts, nuts, etc., and the lower rail 2 is fixed to a vehicle floor not shown in the drawings by bolts, nuts, etc. The locking mechanism 4 having the after-mentioned locking member 9 as a major component is accommodated in the upper rail 3.

As shown in FIGS. 1 and 4, the lower rail 2 is formed by bending a metal plate to have a generally modified C-shaped section with an open top surface. This lower rail 2 has a bottom wall portion 2a, side wall portions 2b, 2c that extend upward from both sides in the rail width direction of the bottom wall portion 2a, top wall portions 2d, 2e that are prepared by inwardly bending the upper ends of the side wall portions 2b, 2c, and downward flange portions 2f, 2g that are prepared by downwardly bending the inner ends of the top wall portions 2d, 2e. In the present embodiment, as is clear from FIG. 4, the right and left side wall portions 2b, 2c are different from each other in height and shape, and the right and left top wall portions 2d, 2e and the downward flange portions 2f, 2g are different from each other in shape.

On the other hand, the upper rail 3 that is slidably fitted into the inside of the lower rail 2 is formed by bending a metal plate to have a generally modified C-shaped section with an open bottom surface. The upper rail 3 has a top wall portion 3a, right and left side wall portions 3b, 3c that extend downwardly from both sides in the rail width direction of this top wall portion 3a, and upward flange portions 3d, 3e that are prepared by outwardly and upwardly bending the lower ends of the side wall portions 3b, 3c. On the side of the side wall portion 3b, a middle leg portion 3f is formed on a base portion side of the upward flange portion 3d, in order to have a rolling contact surface of the after-mentioned rolling element between the side wall portion 3b and the upward flange portion 3d. In the present embodiment, as is clear from FIG. 4, the right and left upward flange portions 3d, 3e are different from each other in height and shape.

As shown in FIG. 4, the upper rail 3 is slidably fitted on both sides of the rail width direction of the upper rail 3 to the lower rail 2, such that the downward flange portion 2f of the lower rail 2 is sandwiched between the side wall portion 3b and the upward flange portion 3d of the upper rail 3 and that the downward flange portion 2g is sandwiched between the side wall portion 3c and the upward flange portion 3e of the upper rail 3. Therefore, as shown in FIG. 4, the seat rail 1 as a combination of the lower rail 2 and the lower rail 3 has a horizontally asymmetrical shape on the section perpendicular to the rail longitudinal direction. The sectional shape of the seat rail 1 may be formed into a horizontally symmetrical shape according to the required functions, etc.

A plurality of steel balls 6 are installed between the lower rail 2 and the upper rail 3, as rolling elements held by retainers 5 (see FIG. 2) that are respectively independently provided at right and left positions in the rail width direction and front and rear positions in the rail longitudinal direction. To hold these steel balls 6, on the side of the upward flange portion 3d of the upper rail, ball rolling grooves 7a, 7b are respectively formed on the middle leg portion 3f and on a tip end portion of the upward flange portion 3d. The steel balls 6 are respectively installed between the ball rolling groove 7a and a lower corner portion of the lower rail 2 and between the ball rolling groove 7b and an upper corner portion of the lower rail 2.

On the other hand, the upward flange portion 3e of the upper rail 3 is formed on its lower and upper surfaces with ball rolling grooves 8a, 8b, respectively. The steel balls 6 are respectively installed between the ball rolling groove 8a and a lower corner portion of the lower rail 2 and between the ball rolling groove 8b and an upper corner portion of the lower rail 2. In FIG. 4, the retainers 5 are omitted for simplification.

In more detail, two pairs of right and left retainers 5 each having a generally rectangular shape are respectively provided at front and rear end portions of the seat rail 1. For example, four of the steel balls 6 may be held by one of the retainers 5. As the steel balls 6 roll to follow the sliding movement of the upper rail 3, it becomes possible to make a smooth movement of the upper rail 3. Although each retainer 5 that holds the steel balls 6 is slidable to follow the movement of the upper rail 3, its position is limited such that the retainer 5 does not deviate from an overlapped range between the lower rail 2 and the upper rail 3 in the longitudinal direction.

As shown in FIGS. 1-4, the locking mechanism 4 for locking and unlocking the upper rail 3 relative to the lower rail 2 at the positional adjustment of the upper rail 3 (seat) relative to the lower rail 2 in the front-back direction is provided at a middle portion of the upper rail 3 in the longitudinal direction.

This locking mechanism 4 is equipped with functional components, that is, (a) a locking member 9 that is disposed in the inside of the upper rail 3, (b) a locking spring (biasing means) 10 that is disposed together with the locking member in the inside of the upper rail 3 and serves as a biasing means to bias the locking member 9 against at least the locking direction as mentioned hereinafter, (c) a release lever (operation member) 11 in a rectangular bar shape as an operation member to be disposed forward of the locking member 9 in the inside of the upper rail 3, and (d) a return spring 12 for the release lever 11. An operation handle (not shown in the drawings) in the form of extending the release lever 11 toward forward of the rail is connected to the release lever 11.

As shown in FIGS. 1 and 3, a tip end of the release lever 11 is bent to form a claw portion 11a. As shown in FIGS. 3 and 4, this claw portion 11a is positioned above the aftermentioned locking member 9. Furthermore, as shown in FIG. 3, the release lever 11 is formed on its lower surface with an engagement groove 11b, and the return spring 12 bent into a modified C-shape is engaged into the engagement groove lib. Both engagement ends 12a of the return spring 12 are fitted into engagement holes 13 formed into the both side wall portions 3b, 3c of the upper rail 3.

A support leg portion 14 in a generally inverse-T shape is formed by cutting and downwardly bending a part of the top wall portion 3a of the upper rail 3. The upper surface of the release lever 11 is in abutment with the lower end surface of the support leg portion 14 at a position that is slightly forward of the engagement groove lib. The release lever 11 is swingable about the support leg portion 14 as the fulcrum. The return spring 12 is engaged at its middle portion with the upper end surface of the support leg portion 14 so that the return spring is biased in a direction to raise a rearward side of the release lever 11 with respect to the fulcrum. Therefore, when no operational force is applied, the release lever 11 itself maintains a condition in which the claw portion 11a of the release lever 11 is in abutment with the top wall portion 3a of the upper rail 3.

On the other hand, corresponding to the locking mechanism 4, as shown in FIGS. 1 and 4, the downward flange portion 2f of the lower rail 2 is formed with a large number of square holes 15 along the longitudinal direction at predetermined regular pitches.

Figure 5:
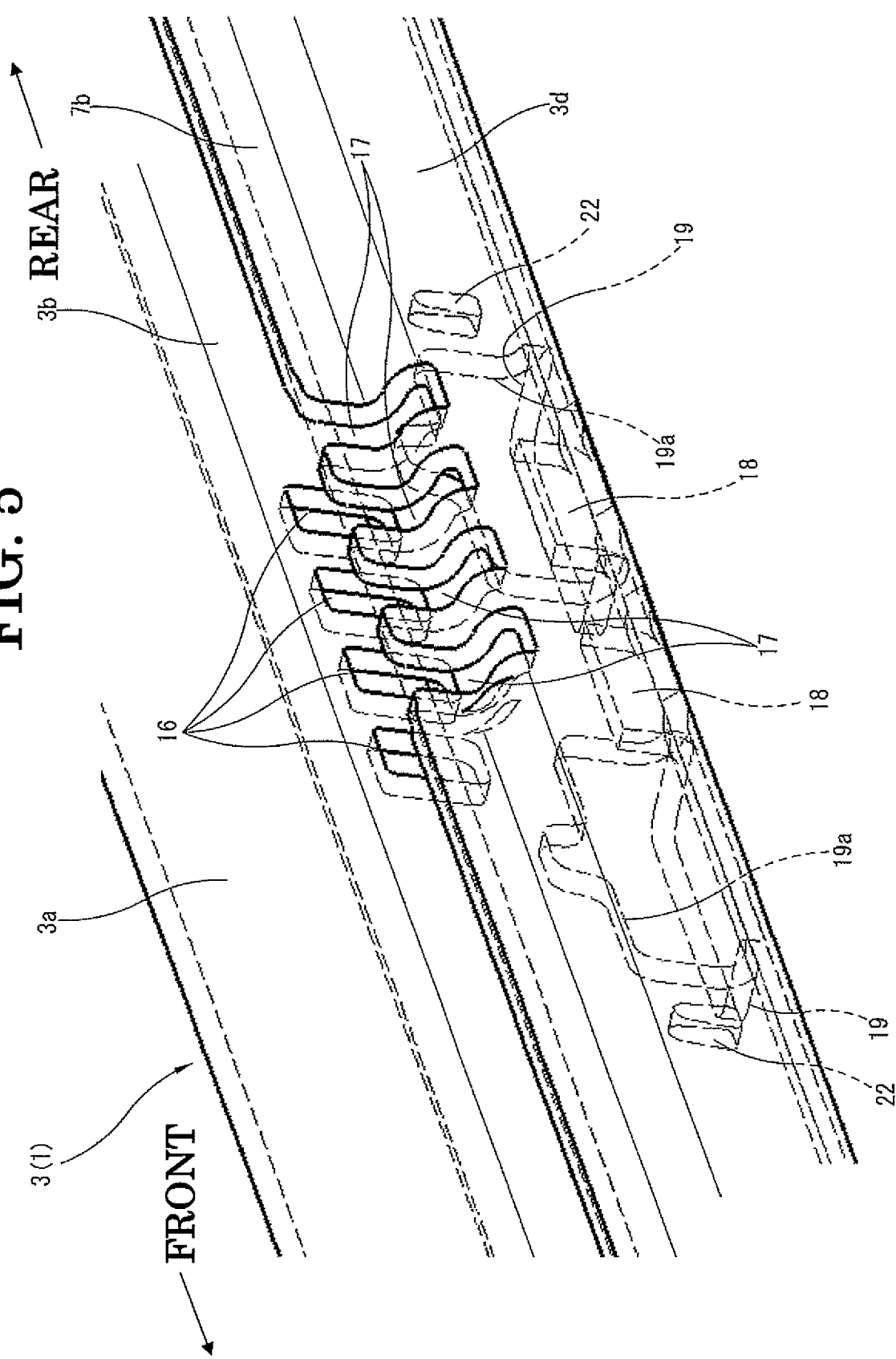
FIG. 5 is an enlarged view showing details of a part "Q" of FIG. 1.
Figure 6:
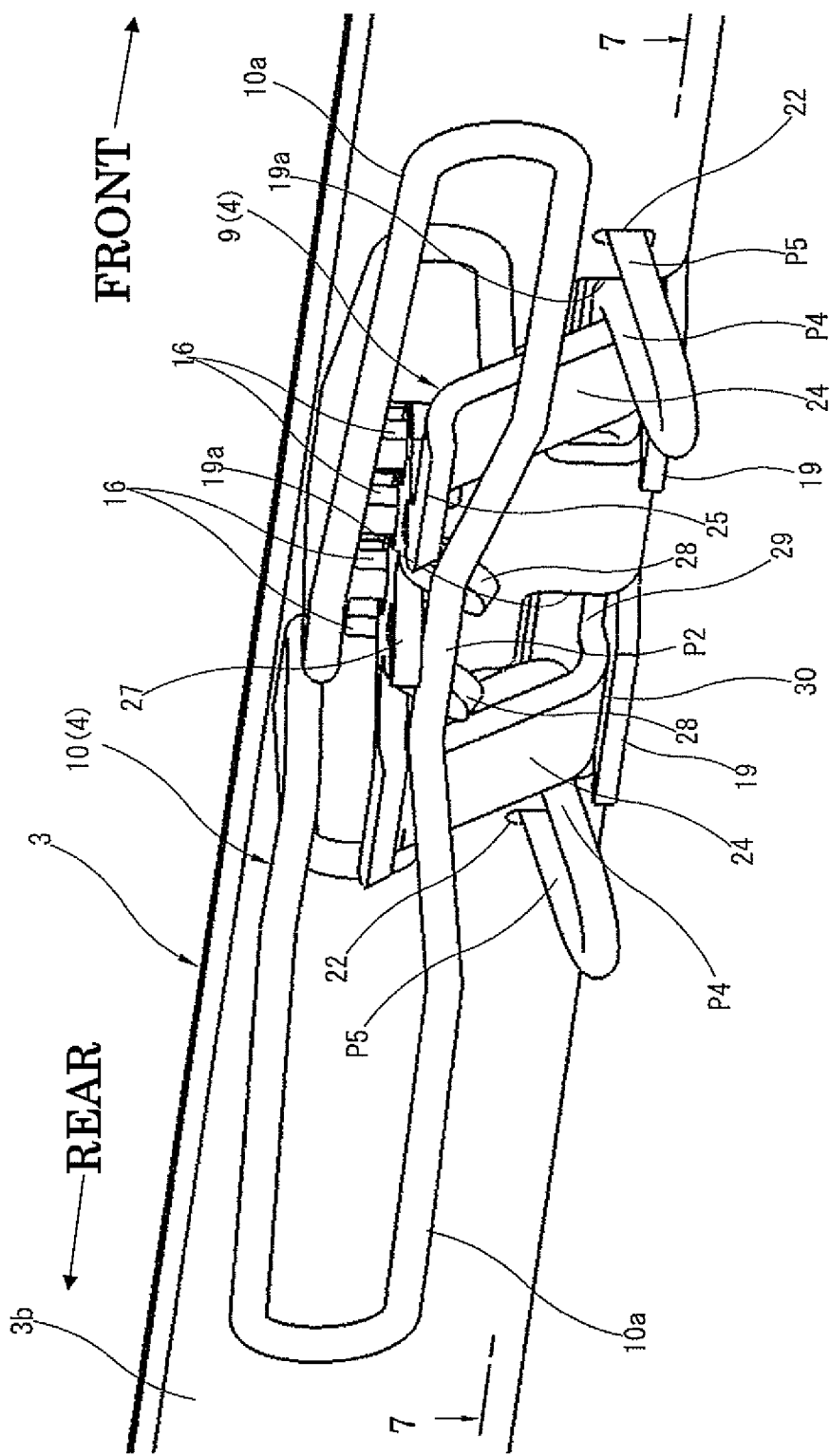
FIG. 6 is perspective view taken from the left of FIG. 4, showing an inside of an upper rail shown in FIG. 4.

FIG. 5 is an enlarged view showing a part "Q" of the upper rail 3 shown in FIG. 1. FIG. 6 is perspective view taken from the left of FIG. 4, showing an inside of the upper rail 3 shown in FIG. 4.

As shown in FIGS. 5 and 6 besides FIG. 1, the side wall portion 3b of the upper rail 3 is formed at its middle portion in the rail longitudinal direction with rectangular locking holes 16, for example, by the number of four (4) to correspond to the number of locking claws of the locking member 9. Furthermore, the upward flange portion 3d of the upper rail 3 is formed at its middle portion in the rail longitudinal direction with a comb-like portion having locking grooves 17, for example, by the number of four (4) at positions corresponding to those of the locking holes 16. The pitches of these locking holes 16 and the locking grooves 17 of the upper rail 3 are the same as those of the locking holes 15 of the lower rail 2.

Therefore, at any position in the longitudinal direction of the upper rail 3, which is slidable in the longitudinal direction relative to the lower rail 2, it is possible to match the locking holes 16 and the locking grooves 17 of the upper rail 3 to the locking holes 15 of the lower rail 2.

Figure 7:
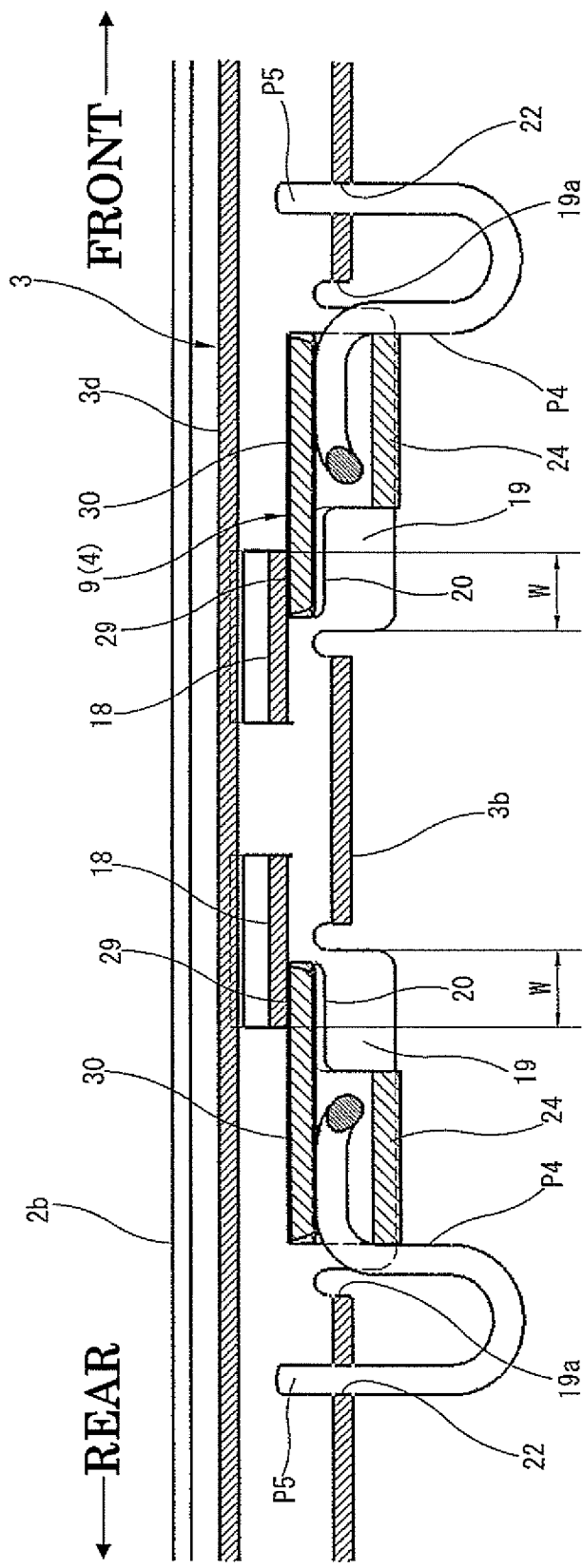
FIG. 7 is a sectional view taken along the line 7-7 of FIG. 6.

FIG. 7 is a sectional view taken along the line C-C of FIG. 6. As shown in FIGS. 6 and 7 besides FIG. 4, below the four locking grooves 17 shown in FIGS. 5 and 6 and at the lower end of the side wall portion 3b of the upper rail 3, a pair of front and rear upward raised wall portions 18, 18 having a predetermined distance therebetween in the rail longitudinal direction is projectingly formed, and a pair of front and rear bottom wall portions 19, 19 that project toward the inside of the rail and have a predetermine distance therebetween in the rail longitudinal direction is formed.

As shown in FIG. 4, each of the front and rear raised wall portions 18, 18 is formed by cutting and raising a part of the middle leg portion 3f on which the ball rolling groove 7a for the steel ball 6 is formed. On the other hand, each of the front and rear bottom wall portions 19, 19 is wider than the raised wall portion 18 in the rail longitudinal direction and is formed by cutting and pressing down a lower end portion of the side wall portion 3b until becoming horizontal. A combination of each raised wall portion 18 and its corresponding bottom wall portion 19 forms a generally right-angled inward corner portion, as shown in FIG. 4.

Furthermore, as shown in FIG. 7, the front raised wall portion 18 and the front bottom wall portion 19 overlap with each other in the rail longitudinal direction, thereby providing an arc-shaped lower inward corner portion 20 with a predetermined curvature at an overlap region W therebetween. The rear raised wall portion 18 and the rear bottom wall portion 19 overlap similarly to provide the same arc-shaped lower inward corner portion 20. As shown in FIG. 4, the lower inward corner portion 20 of the upper rail 3 is diagonally opposed to an upper inward corner portion 21 formed between the top wall portion 3a and the side wall portion 3c of the upper rail 3.

As is clear from FIGS. 5 and 6, the side wall portion 3b of the upper rail 3 is formed with a pair of front and rear openings 19a, due to the formation of the pair of front and rear bottom wall portions 19, and a pair of front and rear elliptical engagement holes 22 respectively positioned close to the front and rear openings 19a.

As shown in FIG. 1, the locking member 9 as a component of the locking mechanism 4 is prepared by three-dimensionally bending a plate-shaped member as a base material. As shown in FIGS. 3, 4 and 6, the locking member 9 has a flat base portion 23 at its middle portion in the rail longitudinal direction, and a pair of oblique front and rear leg portions 24 prepared by obliquely downwardly bending two portions front and rear of the base portion 23. A root portion of the front leg portion 24 close to the base portion 23 serves as a pressing operation portion 25 that is subjected to a pressing operation by the claw portion 11a of the release lever 11 shown in FIG. 3.

As shown in FIGS. 1, 3 and 4, the base portion 23 of the locking member 9 is formed with so-called comb-shaped four locking claws 26 projecting in the rail width direction. The four locking claws are arranged at predetermined pitches identical with those of the locking holes 15 of the lower rail 2 and locking holes 16 of the upper rail 3.

As shown in FIGS. 4 and 6, the base portion 23 of the locking member 9 is formed with a single horizontal engagement portion 27 and a pair of downward engagement portions 28 prepared by obliquely downwardly bending two portions front and rear of the base portion 23, toward a direction opposite to the locking claws 26. As shown in FIGS. 4 and 6, an inward corner portion defined between the single horizontal engagement portion 27 and the pair of downward engagement portions 28 serves as a spring engagement portion of the after-mentioned locking spring 10 against the locking member 9.

Furthermore, as shown in FIGS. 4 and 7 besides FIG. 1, each leg portion 24 of the locking member 9 is formed at its tip end portion with a projection portion 29 having a width wider than the rest of the leg portion 24 such that the projection portions 29 project in opposite directions against each other (see FIG. 7). As shown in FIG. 4, the tip end portion including the projection portion 29 of the leg portion 24 is upwardly bent with a predetermined curvature in a semicylindrical or U-shape to a so-called incompletely curled shape. This curled shape portion serves as an axial or pivot portion 30 of the locking member 9 during a pivotal or swing movement of the locking member 9.

These axial portions 30 are positioned on the same axis that is parallel with the rail longitudinal direction and face the inside of the upper rail 3 through the opening portions 19a. As shown in FIGS. 3, 4, 6 and 7, the locking member 9 is swingably supported at its axial portions 30 as the pivot center on the lower inward corner portions 20 each having a generally right angle as bearings in the overlap regions W (see FIG. 7). Although not shown in the drawing, it is optional to support the axial portions 30 of the locking member 9 on a lower end portion of the upward flange portion 3d, instead of the raised wall portions 18.

As shown in FIG. 1, the locking spring 10 as a component of the locking mechanism 4 is a so-called wire-form-type locking spring prepared by bending a single steel wire into a three dimensional shape that is symmetrical in the longitudinal direction to achieve predetermined spring characteristics.

FIG. 8 is an enlarged view of the locking spring 10 alone. As shown in FIG. 8, the locking spring 10 generally includes (a) a pair of elongated curved portions 10a each being generally U-shaped in the vertical direction to have upper and lower legs extending in the rail longitudinal direction connected by a sharp curved portion, (b) a pair of middle bent portions 10b each being bent at generally right angle in plan view at an inner end of the upper leg, (c) a pair of complex curved portions 10c each being connected to the middle bent portion 10b, then downwardly extending, and then curved to have a generally S-shape or inverse S-shape, and (d) a pair of U-shaped curved portions 10d each being U-shaped curved to turn back in the rail width direction at a position close to the complex curved portion 10c. The middle bent portion 10b extends in the rail width direction as a connection between the elongated curved portion 10a and the complex curved portion 10c and has a generally C-shape in plan view together with end portions of the elongated curved portion 10a and the complex curved portion 10c. An elongated portion 10e extends in the front-back direction in a manner to connect end portions of the lower legs of the elongated curved portions 10a and is smoothly curved into an arcuate shape at its central portion in the longitudinal direction. The complex curved portion 10c may be curved to have a generally crank-shape, in place of a generally S-shape or inverse S-shape.

As shown in FIGS. 4 and 8, the locking spring 10 is formed at an inner end portion of the upper leg of the elongated curved portion 10a with a portion close to the middle bent portion 10b that is slightly bent at a bent portion 110 to have a generally V-shape in plan view. A part corresponding to this bent portion 110 serves as a seated portion P1 that is to be seated on the upper inward corner portion 21 formed between the top wall portion 3a and the side wall portion 3c of the upper rail 3. Furthermore, a middle portion in the rail longitudinal direction of the elongated portion 10e that is inwardly offset in the rail width direction serves as a middle engagement portion P2 that is brought into engagement with an inward corner portion formed between the single horizontal engagement portion 27 and the pair of downward engagement portions 28 of the locking member 9 (see FIGS. 4 and 6).

Similarly, a lower portion of the complex curved portion 10c, which is curved to have a generally S-shape or inverse S-shape, is offset in a direction below the middle engagement portion P2 and toward side wall portion 3b of the upper rail 3. A lower end part of this lower portion serves as a lower engagement portion P3 that is brought into engagement with an inner peripheral surface of the axial portion 30 of the locking member 9. Furthermore, an inner end in the rail longitudinal direction of the U-shaped curved portion 10d serves as a side engagement portion P4 that is brought into engagement with the front end surface of the front leg portion 24 or the rear end surface of the rear leg portion 24 of the locking member 9, as shown in FIGS. 6 and 7. Furthermore, an end portion of the U-shaped curved portion 10d serves as an end engagement portion P5 that is brought into engagement into the engagement hole 22 of the side wall portion 3b of the upper rail 3.

As shown in FIGS. 3, 4 and 6, the installation of the above-mentioned locking spring 10 in the seat sliding device brings a condition in which the bent portion 110 of the elongated curved portion 10a as the seated portion P1 is seated on the upper inward corner portion 21 of the upper rail 3, the middle engagement portion P2 of the elongated portion 10e is engaged with the inward corner portion defined between the single horizontal engagement portion 27 and the pair of downward engagement portions 28 of the locking member 9, the lower engagement portion P3 is engaged with the inner peripheral surface of the axial portion 30 of the locking member 9, the side engagement portion P4 is engaged with the leg portion 24 of the locking member 9, and the end engagement portion P5 is engaged with the engagement hole 22 of the side wall portion 3b of the upper rail 3.

Under the above condition, as shown in FIG. 4, the locking spring 10 is biased at the seated portion P1 and the lower engagement portion P3 by spring characteristics of the middle bent portion 10b and the complex curved portion 10c in a direction to move the seated portion P1 and the lower engagement portion P3 away from each other, such that the seated portion P1 is maintained in engagement with the upper inward corner portion 21 of the upper rail 3. Furthermore, under the above condition, the locking spring 10 is biased at the middle engagement portion P2 by spring characteristic of the U-shaped curved portion 10d in a direction to move the middle engagement portion P2 rightward in the rail width direction and upward in the vertical direction in FIG. 4. That is, the spring characteristic is achieved in a direction prepared by adding the rail width and vertical directions.

Therefore, the locking spring 10 itself is maintained in the upper rail 3 under a condition shown in FIG. 4. As shown in FIG. 4, the locking member 9 is biased by the locking spring 10 in a clockwise (locking) direction at a swing fulcrum of a contact surface between the axial portion 30 and the lower inward corner portion 20. Therefore, as shown in FIGS. 4 and 6, in a condition in which the locking holes 16 and the locking grooves 17 of the upper rail 3 aligned with the locking holes 15 of the lower rail 2, the locking claws 26 of the locking member 9 pass through the locking holes 16, 15 and engage with the locking grooves 17, thereby maintaining a locked condition.

At the same time, as shown in FIG. 4, in the locked condition of the locking member 9, the leg portion 24 extends in a direction close to a diagonal line between the lower inward corner portion 20 and the upper inward corner portion 21 of the upper rail 3, and an inclined portion 10f of the locking spring 10 that is in the vicinity of the lower engagement portion P3 extends in parallel with the leg portion 24. Therefore, the axial portion 30 of the locking member 9 is pressed against the lower inward corner portion 20 defined between the raised wall portions 18 and the bottom wall portion 19 of the upper rail 3. Thus, even if an unlocking operation has been conducted by swinging the locking member 9 in a counterclockwise direction from the condition of FIG. 4, a condition in which the axial portion 30 of the locking member 9 is pressed against the lower inward corner portion 20 is continued and maintained.

Furthermore, as shown in FIGS. 3 and 7, the generally U-shaped side engagement portions P4 of the locking spring 10 are in abutment with end surfaces of the axial portions 30 of the locking member 9 to bias the locking member 9 by two opposed forces in the rail longitudinal direction (front-back direction). Therefore, the position of the locking member 9 in the front-back direction relative to the upper rail 3 is limited, and it is possible to prevent play and movement of the locking claws 26 relative to the locking holes 15, 16 and the locking grooves 17 and the occurrence of beat noise caused by vibration.

As mentioned above, the locking spring 10 shown in FIG. 8 is formed into a complicated three-dimensional shape, such that the locking spring 10 is retained by its own elastic force at its seated portion P1 onto the upper inward corner portion 21 of the upper rail 3 and that the single locking spring 10 provides a first bias force to bias the locking claws 26 of the locking member 9 in the locking direction, a second bias force to press the pair of axial portions 30 of the locking member 9 as the swing fulcrum against the lower inward corner portions 20 of the upper rail 3 as the bearing support portions, and a third bias force to limit the position of the locking member 9 relative to the upper rail 3 in the front-back direction. As a result, the locking spring 10 serves as a composite spring that is capable of simultaneously providing three bias forces acting in substantially three different directions.

As shown in FIG. 8, the locking spring 10 is formed by bending a single wire many times. As is clear from FIGS. 4, 6, etc. besides FIG. 8, the shape of the locking spring 10 is neatly designed to prevent interference of different parts of the locking spring 10 with each other.

Therefore, in the above-structured seat sliding device, as mentioned above, each of FIGS. 3, 4 and 6 shows the locked condition of the seat sliding device. This locked condition is stably maintained, unless the operation force is applied to the release lever 11.

On the other hand, when the operation force is applied to the release lever 11 in clockwise direction in FIG. 3, the release lever 11 is swung on the support leg portion 14 as fulcrum. As this release lever 11 is swung, the claw portion 11a at the tip of the release lever 11 is brought into abutment with the pressing operation portion 25 at the root portion of the front leg portion 24 of the locking member 9 to press the locking member 9 down.

As the locking member 9 is pressed down by the release lever 11, the locking member 9 is swung in counter-clockwise direction in FIG. 4 on the front and rear axial portions 30 as fulcrum, which are supported on the lower inward corner portions 20 of the upper rail 3. As the locking member 9 is swung, the locking claws 26 come out of the locking grooves 17, then the locking holes 15, and then the locking holes 16 of the seat rail 1, thereby achieving the unlocked condition. As shown in FIG. 4, a stopper 39 to limit the movement at the rotation of the locking member 9 in the lock release direction is formed by cutting and bending a lower end part of the side wall portion 3c of the upper rail 3 until it becomes generally horizontal.

With this, the upper rail 3 is allowed for the first time to make a sliding movement relative to the lower rail 2. Consequently, it becomes possible to adjust the position of the seat (not shown in the drawings) mounted on the upper rail 3 in the front-back direction.

Under this unlocked condition, the elongated portion 10e of the locking spring 10 including the middle engagement portion P2 shown in FIGS. 4 and 8 is downwardly greatly bent to follow the movement of the locking member 9, but its other parts are not displaced greatly and are maintained in the self-retaining condition shown in FIG. 4. Therefore, even under the unlocked condition, similar to the locked condition, the locking member 9 is biased in the locking direction, its front and rear axial portions 30 are biased against the lower inward corner portions 20, and the locking member 9 is further biased to limit the position of the locking member 9 in the rail longitudinal direction.

On the other hand, when the operation force applied to the release lever 11 is released, the release lever 11 returns to the original condition by the returning force (biasing force) of the return spring 12, and the locking member 9 also returns by the biasing force in the locking direction to the original locked condition shown in FIG. 4.

As long as the locking spring 10 has the above-mentioned necessary functions, the locking spring 10 is not necessarily limited to one shown in FIG. 8 in terms of its type and shape. That is, in the present embodiment, the single locking spring 10 includes a part to bias the locking member 9 in the locking direction, a part to bias the axial portions 30 of the locking member 9 against the lower inward corner portions 20 of the upper rail 3, and other parts. It is, however, optional to provide separate locking springs to include these parts.

As mentioned above, according to the seat sliding device of the present embodiment, in the locking mechanism 4, the pair of axial portions 30 to serve as the swing fulcrum of the locking member 9 is formed to be integral with the locking member 9 itself. Furthermore, these axial portions 30 of the locking member 9 are pressed against and supported on the lower inward corner portions 20 of the upper rail 3 as bearing portions each being formed between the raised wall portion 18 and the bottom wall portion 19 of the upper rail 3. Therefore, it is possible to reduce the number of parts and simplify the structure of the bearing portion. Furthermore, the seat sliding device is superior in operation stability, even if the locking member 9 has a large swing angle.

Furthermore, the locking spring 10 is formed as a single spring member, although it has a function of biasing the locking member 9 in the locking direction, a function of biasing the pair of axial portions 30 of the locking member 9 against the lower inward corner portions of the upper rail 3, and a function of biasing the locking member by two opposed forces in the rail longitudinal direction to limit the position of the locking member 9 in the front-back direction. This also makes it possible to reduce the number of parts and becomes advantageous in terms of making the seat rail 1 light in weight and compact.

Furthermore, the present embodiment has the following advantages, in addition to the above-mentioned advantageous effects.

A first advantageous effect is as follows. As shown in FIG. 4, the lower inward corner portion 20 of the upper rail 3 supporting thereon the axial portion 30 of the locking member 9 and the upper inward corner portion 21 of the upper rail 3 are formed as two opposite corners connected by a diagonal, when the upper rail shown in FIG. 4 is defined as a rectangle. Furthermore, the locking spring 10 biases the axial portion 30 against the lower inward corner portion 20 in a direction substantially along this diagonal. Therefore, the arrangement of the parts in the upper rail 3 is optimized, and it becomes more advantageous in terms of making the seat rail 1 light in weight and compact.

A second advantageous effect is as follows. As shown in FIG. 7, the raised wall portion 18 and the bottom wall portion 19 of the upper rail 3, which form the lower inward corner portion 20, are offset from each other or overlapped with each other in the longitudinal direction of the upper rail 3 to have the overlap region W therebetween. Therefore, it becomes advantageous in terms of securing rigidity of the upper rail 3.

A third advantageous effect is as follows. As shown in FIG. 7, the front and rear axial portions 30 are respectively formed at both front and rear end portions in the rail longitudinal direction of the locking member 9. Two pairs of the raised wall portions 18 and the bottom wall portions 19 of the upper rail 3, which form the lower inward corner portions 20, are respectively formed at two positions in the rail longitudinal direction, which correspond to the positions of the axial portions 30 of the locking member 9. Furthermore, the raised wall portions 18 are disposed inside of the bottom wall portions 19 in the rail longitudinal direction. Therefore, even if the front and rear raised wall portions 18 are formed by cutting and raising a part of the middle leg portion 3f having thereon the ball rolling groove 7a for the steel ball 6, a range to limit rolling the steel ball 6 by the raised wall portions 18 is small. This provides an advantage that the rolling range of the steel ball 6 in the rail longitudinal direction can be secured as long as possible.

A fourth advantageous effect is as follows. As shown in FIGS. 3 and 4, the locking member 9 has the pressing operation portion 25 that is to be pressed down by the release lever 11 when conducting the unlocking operation. This release lever 11 together with the locking member 9 is disposed in the inside of the upper rail 3. That is, all of the locking member 9 including the pressing operation portion 25, the locking spring 10, and the release lever 11 as components of the locking mechanism 4 are accommodated in a rail section (see FIG. 4) of the seat rail 1 including both of the lower rail 2 and the upper rail 3, which is perpendicular to the rail longitudinal direction. In other words, any part of the locking mechanism 4 never projects in the rail width direction. Therefore, it becomes more advantageous for making the seat rail 1 light in weight and compact.

A fifth advantageous effect is as follows. The locking spring 10 is engaged at its end engagement portions P5 into the engagement holes 22 of the side wall portion 3b of the upper rail 3. Furthermore, the locking spring 10 biases the locking member 9 by two opposed forces from both sides in the rail longitudinal direction to limit the position of the locking member 9. Therefore, it is possible to effectively prevent play and movement of the locking member 9 and the occurrence of its beat noise caused by vibration.

A sixth advantageous effect is as follows. Of the locking spring 10, its middle bent portions 10b are disposed along and immediately below the top wall portion 3a of the upper rail 3 (see FIGS. 3 and 4), and its complex curved portions 10c are disposed substantially along and close to the side wall portion 3b of the upper rail (see FIG. 4). Therefore, it is possible to effectively provide an operation space of the release lever 11 in a small inside space of the upper rail 3.

The entire contents of Japanese Patent Application Nos. 2018-235959 and 2018-235960 each filed on Dec. 18, 2018 are incorporated herein by reference.

What is claimed is:

1. A seat sliding device for vehicles, comprising:
a lower rail having a bottom wall portion, first and second upward side wall portions extending upward from both sides in a width direction of the bottom wall portion, first and second inward top wall portions respectively extending inward from upper ends of the first and second upward side wall portions, first and second downward flange portions respectively extending downward from inner ends of the first and second inward top wall portions;
an upper rail that is fitted to the lower rail such that the upper rail is slidable in a longitudinal direction relative to the lower rail, the upper rail having a top wall portion, first and second downward side wall portions extending downward from both sides in a width direction of the top wall portion, a first upward flange portion extending outward and upward from a lower end of the first downward side wall portion and fitted between the first upward side wall portion of the lower rail and the first downward flange portion of the lower rail, and a second upward flange portion extending outward and upward from a lower end of the second downward side wall portion and fitted between the second upward side wall portion of the lower rail and the second downward flange portion of the lower rail; and
a locking mechanism for locking or unlocking the upper rail relative to the lower rail, the locking mechanism having a locking member that is biased in a locking direction to lock the upper rail relative to the lower rail by an engagement of the locking member with the upper and lower rails at a part of the seat sliding device where at least one of the first and second upward side wall portions of the lower rail overlaps with at least one of the first and second downward side wall portions of the upper rail,
wherein the upper rail is equipped at a lower end of the first downward side wall portion of the upper rail with a lower inward corner portion that is formed of a raised wall portion and a bottom wall portion,
wherein the locking member includes an axial portion having an axis along the longitudinal direction, the axial portion being placed on and biased against the lower inward corner portion of the upper rail such that the locking member is swingable about the axis of the axial portion between a first position where the upper rail is locked relative to the lower rail and a second position where the upper rail is unlocked relative to the lower rail.

2. The seat sliding device for vehicles as claimed in claim 1, wherein the lower inward corner portion of the upper rail is diagonally opposed to an upper inward corner portion formed between the top wall portion of the upper rail and the second downward side wall portion of the upper rail, wherein the axial portion of the locking member is biased against the lower inward corner portion of the upper rail in a direction substantially along a diagonal line between the lower inward corner portion and the upper inward corner portion of the upper rail.

3. The seat sliding device for vehicles as claimed in claim 1, wherein a middle leg portion is formed between the lower end of the first downward side wall portion of the upper rail and the first upward flange portion of the upper rail, wherein the middle leg portion of the upper rail is formed with a groove for rolling therein a rolling body interposed between the lower rail and the upper rail, wherein the raised wall portion of the upper rail is formed at the middle leg portion of the upper rail.

4. The seat sliding device for vehicles as claimed in claim 1, wherein the bottom wall portion of the upper rail extends inward from the lower end of the first downward side wall portion of the upper rail, wherein the bottom wall portion of the upper rail has a length in the longitudinal direction that is longer than a length of the axial portion of the locking member in the longitudinal direction.

5. The seat sliding device for vehicles as claimed in claim 3, wherein the raised wall portion and the bottom wall portion of the upper rail are overlapped with each other in the longitudinal direction.

6. The seat sliding device for vehicles as claimed in claim 3, wherein the locking member has the axial portion at each of both ends in the longitudinal direction of the locking member, wherein a combination of the raised wall portion and the bottom wall portion of the upper rail is formed at a position in the longitudinal direction corresponding to each of both ends in the longitudinal direction of the locking member, wherein the raised wall portions are disposed inside of the bottom wall portions in the longitudinal direction.

7. The seat sliding device for vehicles as claimed in claim 1, wherein the locking member is a plate member comprising:

a base portion;

a locking claw that projects from the base portion in a width direction of the seat sliding device, passes through a locking hole of the first downward side wall portion of the upper rail and a locking hole of the first downward flange portion of the lower rail at the first position of the locking member where the upper rail is locked relative to the lower rail, and comes out of the locking hole of the first downward flange portion of the lower rail at the second position of the locking member where the upper rail is unlocked relative to the lower rail; and a leg portion that extends downward from the base portion, the leg portion having a tip end portion that is bent to provide a cylindrical or semi-cylindrical inner surface, thereby forming the axial portion of the locking member at the tip end portion.

8. The seat sliding device for vehicles as claimed in claim 7, wherein the leg portion of the locking member is formed in a vicinity of the base portion of the locking member with a pressing operation portion that is pressed down to swing the locking member from the first position to the second position.

9. The seat sliding device for vehicles as claimed in claim 7, wherein a spring member is engaged with the cylindrical or semi-cylindrical inner surface of the leg portion of the locking member such that the locking member is biased at the axial portion against the lower inward corner portion of the upper rail.

10. The seat sliding device for vehicles as claimed in claim 8, wherein all of the locking member including the pressing operation portion and the spring member are accommodated in an inside space of the seat sliding device.

11. The seat sliding device for vehicles as claimed in claim 1, wherein the locking member is biased in the locking direction by a single spring member comprising a seated portion that is seated on a part of the upper rail, a middle engagement portion that is engaged with an upper part of the locking member to bias the locking member in the locking direction, and a lower engagement portion that is engaged with a lower part of the locking member to bias the axial portion of the locking member against the lower inward corner portion of the upper rail.

12. The seat sliding device for vehicles as claimed in claim 11, wherein the lower inward corner portion of the upper rail is diagonally opposed to an upper inward corner portion formed between the top wall portion of the upper rail and the second downward side wall portion of the upper rail, wherein the axial portion of the locking member is biased against the lower inward corner portion of the upper rail in a direction substantially along a diagonal line between the lower inward corner portion and the upper inward corner portion of the upper rail.

13. The seat sliding device for vehicles as claimed in claim 12, wherein the single spring member further comprises a side engagement portion that limits a position of the axial portion of the locking member relative to the lower inward corner portion of the upper rail in the longitudinal direction.

14. The seat sliding device for vehicles as claimed in claim 13, wherein the single spring member further comprises:

a middle bent portion that extends from the seated portion along the top wall portion of the upper rail;

an elongated portion that has a first part extending from the seated portion in the longitudinal direction, a second part that is connected to the first part and is bent into a generally U-shape, and a third part that is connected to the second part and is curved at a central portion in the longitudinal direction including the middle engagement portion into an arcuate shape; and a complex curved portion that extends downward from the middle bent portion, is bent into a generally S-shape or inverse S-shape, and has a lower end serving as the lower engagement portion.

15. The seat sliding device for vehicles as claimed in claim 14, wherein the complex curved portion and the middle bent portion of the single spring member are configured to generate a spring force substantially along a diagonal line between the lower inward corner portion and the upper inward corner portion of the upper rail, wherein the axial portion of the locking member is biased against the lower inward corner portion by the spring force.

16. The seat sliding device for vehicles as claimed in claim 15, wherein the complex curved portion of the single spring member is directly connected to the middle bent portion, a part of the complex curved portion except the lower engagement portion being disposed along the first downward side wall portion of the upper rail.

17. The seat sliding device for vehicles as claimed in claim 16, wherein the single spring member further comprises front and rear U-shaped curved portions, each being directly connected to each complex curved portion and being bent in a width direction of the seat sliding device, wherein a part of each U-shaped curved portion serves as the side engagement portion, and an end portion of the U-shaped curved portion is engaged with a part of the upper rail, wherein the locking member is sandwiched between the side engagement portions in the longitudinal direction such that a position of the locking member in the longitudinal direction is limited.

18. The seat sliding device for vehicles as claimed in claim 17, wherein the end portion of the U-shaped curved portion is engaged into a hole of the first downward side wall portion of the upper rail.

\* \* \* \* \*